(12) United States Patent
Gardner

(10) Patent No.: US 7,140,685 B2
(45) Date of Patent: Nov. 28, 2006

(54) SWIVEL CHAIR JOINT

(76) Inventor: Kenneth J. Gardner, 74-425 Kealakehe Pkwy., #10, Kailua-Kona, HI (US) 96740

( * ) Notice: Subject to any disclaimer, the term of this patent is extended or adjusted under 35 U.S.C. 154(b) by 467 days.

(21) Appl. No.: 10/386,314

(22) Filed: Mar. 11, 2003

(65) Prior Publication Data

US 2004/0195884 A1    Oct. 7, 2004

(51) Int. Cl.
*A47C 3/18* (2006.01)
(52) U.S. Cl. .................. 297/344.26; 297/344.21; 248/425; 403/119
(58) Field of Classification Search ........... 297/344.21, 297/344.26; 248/425 X, 415, 161, 159; 403/109.5, 403/119
See application file for complete search history.

(56) References Cited

U.S. PATENT DOCUMENTS

| 875,494 | A |  | 12/1907 | Bedell |  |
| 1,559,670 | A |  | 11/1925 | Buckwalter |  |
| 2,182,012 | A |  | 12/1939 | Bunnell |  |
| 3,593,954 | A | * | 7/1971 | Ritchie et al. | 297/344.21 |
| 4,181,281 | A |  | 1/1980 | Kosak |  |
| 4,977,848 | A | * | 12/1990 | Currey | 297/344.22 |
| 5,039,164 | A | * | 8/1991 | Gibbs | 297/344.26 |
| 5,117,617 | A |  | 6/1992 | Scag |  |
| 5,251,987 | A |  | 10/1993 | Supanz |  |
| 6,047,939 | A |  | 4/2000 | Kim |  |
| 6,619,742 | B1 | * | 9/2003 | Bellefleur | 297/344.21 X |

* cited by examiner

*Primary Examiner*—Anthony D. Barfield
(74) *Attorney, Agent, or Firm*—Michael R. McKenna

(57) ABSTRACT

A swivel chair joint utilizing a tapered roller bearing assembly to substantially transform the seating load to the tapered roller bearings and thereby reducing frictional resistance to swiveling.

17 Claims, 2 Drawing Sheets

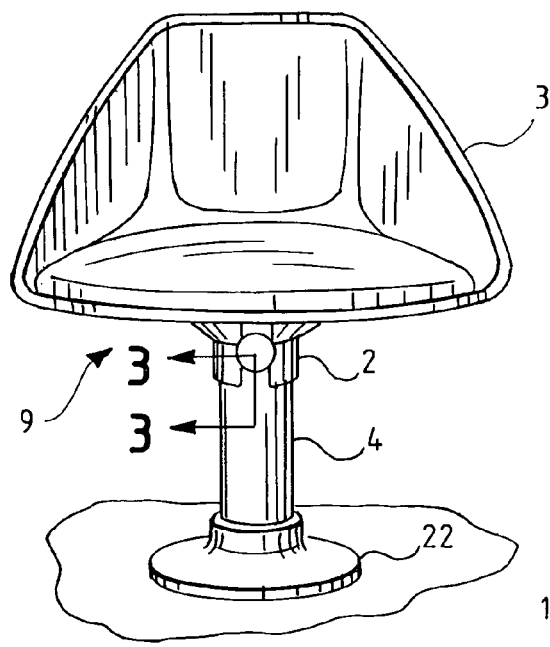
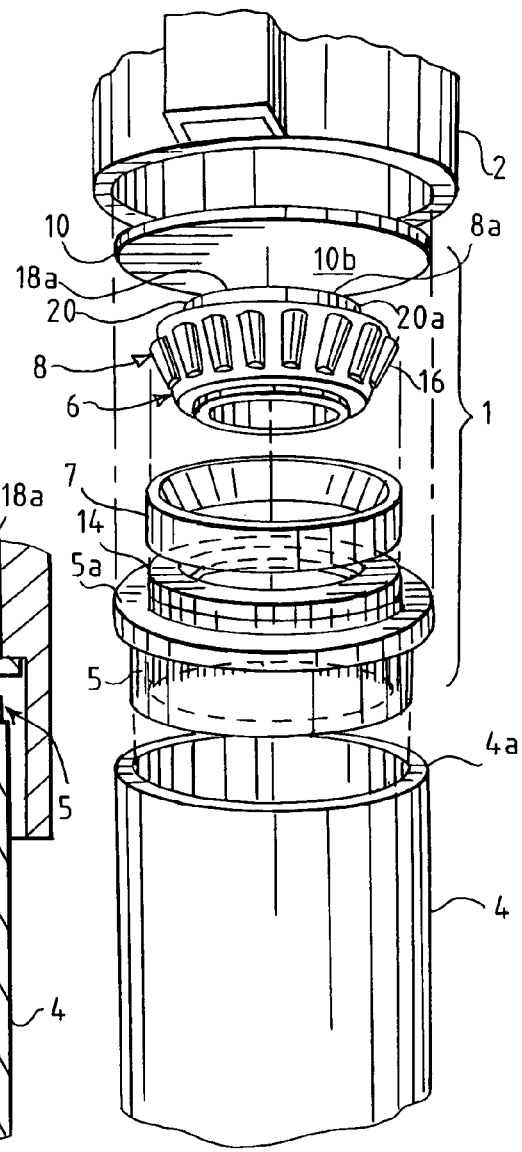
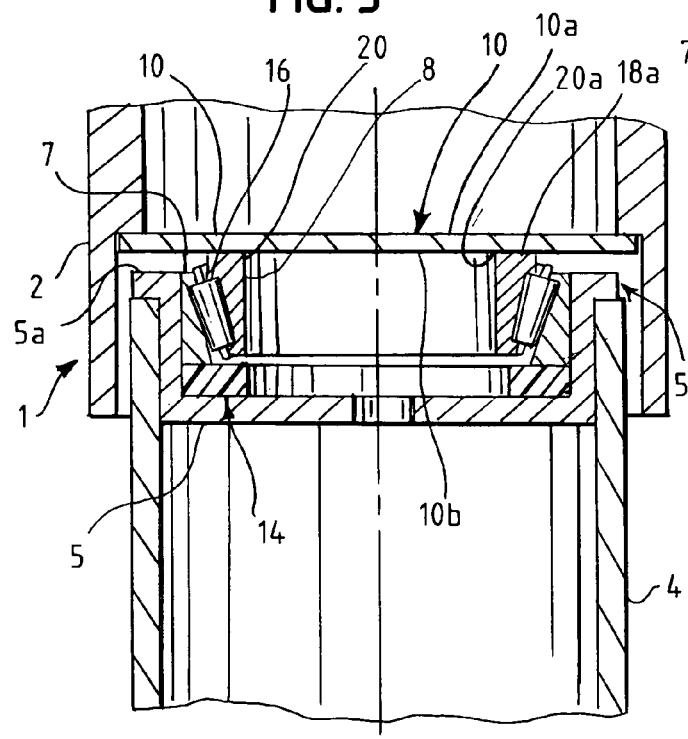

SWIVEL CHAIR JOINT

BACKGROUND OF THE INVENTION

This invention relates to a swivel chair joint for rotationally joining a seat to a post.

A chair often is viewed as a piece of furniture consisting of a seat, legs, back, and often arms, designed to accommodate one person. As its name implies, a swivel chair may include a seat connected to a bearing that swivels about a stationary post connected to a base. A flat cylindrical bearing swivel provides rotational movement while a tilt cylindrical bearing swivel additionally permits the user to pitch the seat back and forth. Add-ons, such as a gas lift for adjustable height or leather upholstery significantly may increase the price of such a chair.

Inexpensive swivel chairs typically include a pre-molded plastic seat connected to a seat support that includes an opening and a stationary post connected to a base. To assemble this inexpensive swivel chair, the opening of the seat support is aligned over the stationary post so that the stationary post is concentric with the seat support opening. With the alignment complete, the seat is then pressed downward about two inches until the top of the stationary post reaches a stop located within the seat support opening.

For a conventional swivel chair, it is important that the clearance between the seat support opening and the stationary post be minimized to prevent horizontal movement of the seat. This minimal clearance makes it difficult to align the seat support to the stationary post. Moreover, the seat typically obscures the assembler's view of the adjoining features so that an assembler often performs this alignment step blindly. The blind assembly plus minimal clearance makes it very difficult to assemble or repair a conventional swivel chair.

The bearing provides for a swivel chair typically includes rollers that are straight right cylindrical. Although cylindrical roller bearings are good at withstanding the radial loads experienced by a swivel chair, they are poor at handling the thrust loads caused by the movement of a chair user. Inexpensive swivel chairs typically use the post exterior surface as a wear surface. Over time, these thrust loads damage swivel chairs using cylindrical roller bearings.

Another typical swivel chair is made up of a chair with a cushion, a seat support which may include a slider or a mounting plate swivel, and a post or pedestal. Sliders or swivels allow a seat to move. A slider will allow a seat to move fore and aft (forward and backward). A swivel will allow a seat to rotate 360 degrees. In some cases, a swivel is included within a slider allowing both the fore and aft movement and the rotation of the seat. Swivels primarily consist of a nylon cup-shaped bushing that is placed open end down between the seat support and the post. The bushing eliminates the scratching of the post and reduces rotational friction. Such prior art designs tend to bind with heavy seating loads and after wear.

The principal disadvantage of such a device is its inherent drag and ultimate deterioration. Existing pivot movement chairs include U.S. Pat. No. 4,181,281 issued in 1980 to Kosak for an articulated multi-swivel chair comprising a bearing cup fitted with roller bearings. Also see U.S. Pat. No. 875,494 issued in 1907 to Bedell for ball-bearing for chairs comprising a bearing assembly for chair wherein the assembly is provided with a bearing cup and cone joint fitted with ball-type bearings.

Furthermore, U.S. Pat. No. 6,047,939 issued to Kim in 2000 teaches an adjustable support structure for a video appliance which comprises a free floating coupling having a semi-spherical ball received within a mating cup. And U.S. Pat. Nos. 5,117,617 and 2,182,012 issued in 1992 to Scag and in 1937 to Bunnell, respectively teach a spindle using tapered roller bearings. Moreover, see U.S. Pat. Nos. 5,251,987 and 1,559,670, issued in 1993 and 1925 respectively, for devices comprising a cup-type bearing assembly having a cone inter-fitted within a cup receiver, which are provided with roller bearings disposed within a space between the cone and the cup. There is a need for an inexpensive swivel chair that is easy to assemble and resistant to thrust loads.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

To alleviate this problem, and others which will become apparent from the disclosure which follows, the present invention conveniently provides a swivel chair joint utilizing a tapered roller bearing assembly to substantially transform the seating load to the tapered roller bearings and thereby reducing frictional resistance to swiveling.

The swivel joint of the present invention has a cup, an outer race, and an inner race assembly with a top portion of the inner race assembly extending out of the cup. The tapered roller bearing assembly is disposed on a top end of the post. The seat support rests upon the top portion of the inner race assembly, so that the seat is rotationally joined to the post. Additionally, the swivel chair joint may further comprise a disc, disposed between the seat support and the top portion of the inner race assembly, which is free floating and self-centering.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a swivel chair joint for rotationally joining a seat support extending from a seat to a post. The swivel chair joint comprises a cup, a tapered roller bearing assembly having an outer race and an inner race assembly. A top portion of the inner race assembly extends out of the cup, and the tapered roller bearing assembly is disposed on a top end of the post. The seat support rests upon the top portion of the inner race assembly, so that the seat is rotationally joined to the post.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a perspective view of a swivel chair of the present invention;

FIG. 2 is an exploded perspective view of the swivel chair joint of the present invention showing (from bottom to top) a seat post, a cup adapted to fit a recess in the top of the seat post, a separating element in the shape of a ring, an outer race, an inner race assembly, a disc, and a seat support;

FIG. 3 is a side elevation view of the swivel chair joint taken along the line 3—3 of FIG. 1, showing the cup disposed in the recess in the top of the seat post, with the separating element in the shape of a ring disposed on the floor of the cup, an outer race disposed on the separating element, the inner race assembly disposed in the outer race, with a top portion of the inner race assembly extending upwardly above a top edge of the cup, a flat disc resting on top portion of the inner race assembly, and a seat disposed on said disc;

DETAILED DESCRIPTION OF THE INVENTION

Figure 4:
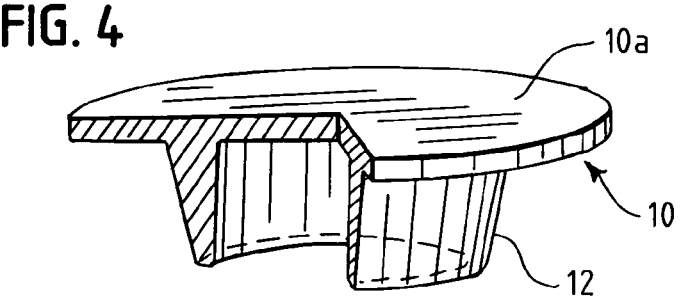
FIG. 4 is a perspective view of a first alternative embodiment of the disc of the swivel chair joint.

The invention relates to swivel joint apparatus for a swivel chair that employs a tapered roller bearing assembly as part of the swivel joint. Tapered roller bearings provide several important and unique performance characteristics enabling them to meet a wide range of application requirements. Tapered roller bearings consist of four basic components, including the inner race, the outer race, tapered rollers, and a cage for retaining the rollers. Under normal operating conditions the inner race, outer race and rollers carry the load while the cage spaces and retains the rollers. The inner race, roller and cage is referred to as the inner race assembly and this is usually separatable from the outer race.

The greater the angle between the outer race and bearing center line, the greater is the ratio of the thrust to the radial load capacity. Steep angle relative to the center axis provides for heavy thrust loads.

In the instant invention the assembly is disposed in a vertical post, designed to support a swivel chair. Actually the outer race is positioned to fit into a cup disposed on the top opening in the post with the upper flange of the cup resting on the upper rim of the post. Tapered roller bearing assembly including the caged tapered rollers and inner race are adapted to be disposed within the outer race.

The tapered roller bearing assembly should be adapted to allow the lower portion of the inner race including the bottom portion of the assembly to have a minimal clearance between the outer race and the lower portion of the tapered roller bearing assembly to allow the assembly to rotate freely without frictional restrictions due to contact with the outer race. This can be accomplished in a number of ways. One includes appropriate sizing of the outer race relative to the inner race in order to elevate the roller assembly and maintain clearance for rotation. The other means is to design the cup without a floor or with a downwardly tapered floor so that a floor will not contact with the rotating assembly. A third means, when utilizing standard off-the-shelf components for the tapered roller bearing assembly of this invention is to use a friction reducing nylon, Teflon®, plastic or the like peripheral ring or disc (a separating element) which can be disposed between the floor of the cup and the outer race thereby elevating the inner race and roller bearing assembly so that optimal rotation is achieved.

In the foregoing configurations, it is required that the upper rim of the inner race be disposed at a spaced distance above the upper rim of the cup to allow the upper rim of the inner space to engage the free floating disc. The free floating disc can be used to support a swivel or slider chair support. Rather than employing a friction reducing sleeve upon which the swivel chair and/or a slider for a swivel chair rests, the instant invention provides a rotationally adapted swivel joint with a free floating disc supported by the tapered roller bearing assembly just described. Since the disc is simply resting on the inner race, this free floating design allows the disc to become self centering for purposes of receiving and transmitting thrust from the chair and the weight of an individual in motion disposed thereon.

Without departing from the generality of the invention disclosed herein and without limiting the scope of the invention, the discussion that follows will refer to the invention as depicted in the drawing.

The preferred embodiments of the apparatus depicted in the drawing comprise a swivel chair joint 1 for rotationally joining a seat support 2 extending from a seat 3 to a post 4. The swivel chair joint comprises a cup 5, a tapered roller bearing assembly 6 having an outer race 7 and an inner race assembly 8. A top portion 8a of the inner race assembly 8 extends out of the cup 5, and the tapered roller bearing assembly is disposed on a top end 4a of the post 4. The seat support 2 rests upon the top portion 8a of the inner race assembly, so that the seat 3 is rotationally joined to the post 4.

Figure 5:
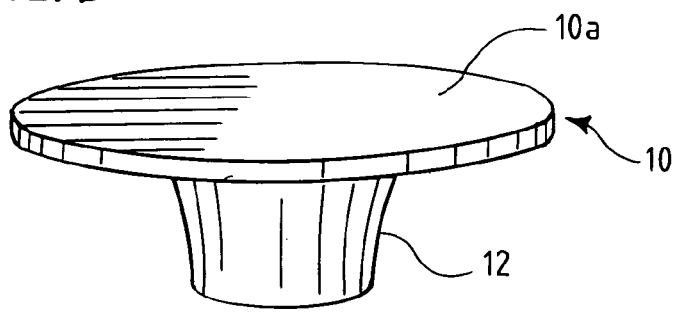
FIG. 5 is a perspective view of a second alternative embodiment of the disc of the swivel chair joint.
Figure 6:
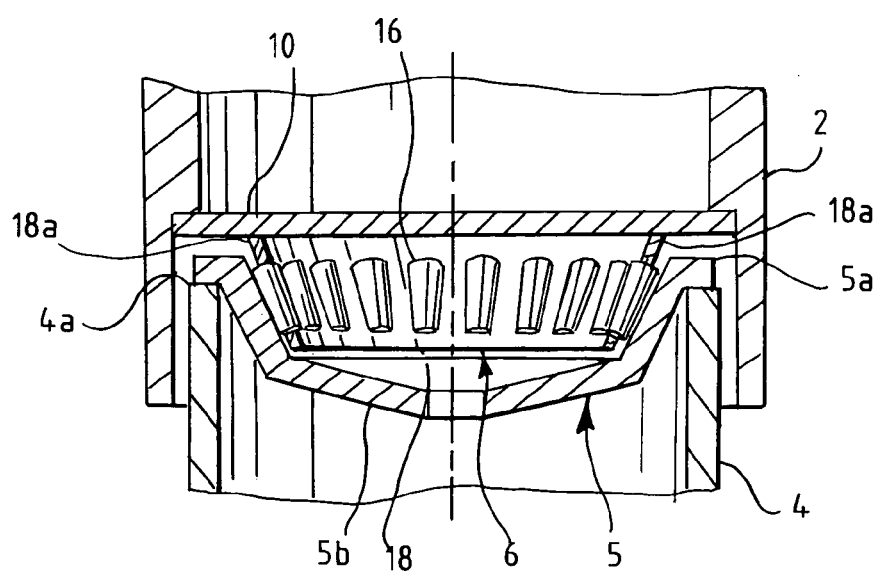
FIG. 6 is a side elevation view of a preferred embodiment of a cage showing a top portion of the cage extending upwardly above a top edge of the cup.

Preferably, the swivel chair joint further comprises a disc 10 disposed between the seat support 2 and the top portion 8a of the inner race assembly 8, the disc 10 is free floating and self-centering. The disc may have an top surface 10a and a bottom surface 10b, with the bottom surface proximate to the top portion 8a of the inner race assembly. As shown in FIGS. 4 and 5, the bottom surface may have a downwardly extending protuberance 12 which can engage the inner race assembly 8.

Another preferred aspect of the swivel chair joint of this important invention is a separating element 14 that can be used when the off-the-shelf cup 5, used with the tapered roller bearing assembly 6, has a floor 5b, as shown in FIG. 3. The separating element 14, shown as a ring in the drawing, can be disposed between the inner race assembly 8 and the floor 5b of the cup 5 to extend the top portion 8a of the inner race assembly 8 out of the cup 5.

Another preferred embodiment of the swivel chair joint of the present invention comprises a cup 5, a tapered roller bearing assembly 6, and a disc 10 with a top surface 10a and a bottom surface 10b. The tapered roller bearing assembly 6 has an outer race 7, tapered rollers 16, and a cage 18 for retaining the rollers and the cage has a top circular edge 18a that protrudes above a top edge of the cup. The bottom surface 10b of the disc is disposed adjacent to and supported by the top circular edge 18a of the cage, so that the tapered roller bearing assembly 6 can be disposed in an upright post 4 and the top surface 10a of the disc can support a seat support 2 connected to a seat 3.

In another preferred embodiment of the swivel chair joint 1 includes a cup 5, a tapered roller bearing assembly 6, and a disc 10 with a top surface and a bottom surface. The tapered roller bearing assembly has an inner race 20, an outer race 7, tapered rollers 16, and a cage 18 for retaining the rollers. The inner race 20 comprises a top circular edge 20a that protrudes above a top edge 5a of the cup 5. The bottom surface 10b is disposed adjacent to and supported by the top circular edge 20a of the inner race 20 and the top surface 10a supports a seat support 2 connected to a seat 3. The tapered roller bearing assembly 6 can thus be disposed on an upright post 4 with the disc 10 disposed between the tapered roller bearing assembly 6 and the seat 3. Additionally, the disc 10 may be free floating between the upright post 4 and the seat 3, so that the free floating disc is self-centering.

The instant invention further provides for a swivel chair 9 comprising an upright post 4, a seat support 2 connected to a seat 3, and a tapered roller bearing assembly positioned between the upright post and the seat support. Preferably, the tapered roller bearing assembly 6 used with a cup 5, has an outer race 7 and an inner race assembly 8, with a top portion 8a of the inner race assembly extending out of the cup 5, the tapered roller bearing assembly disposed on a top end 4a of the post and the seat support 2 resting upon the top portion 8a of the inner race assembly, so that the seat 3 is rotationally joined to the post 4.

Furthermore, it may comprise a disc 10 disposed between the seat support 2 and the top portion 8a of the inner race assembly 8. Preferably, the disc is free floating and is self-centering. Additionally, the disc has a top surface 10a and a bottom surface 10b. The bottom surface 10b is proximate to the top portion 8a of the inner race assembly, and the bottom surface 10b has a downwardly extending protuberance 12 which may engage the inner race assembly 8. Additionally, a separating element 14 may be included when the cup 5 has a floor 5b. The separating element 14 can be disposed between the inner race assembly 8 and the floor 5b of the cup, so that the top portion 8a of the inner race assembly can be arranged to extend out of the cup 5 by the separating element 14. The swivel chair 9 may have the post 4 that is stationarily supported by a base 22.

A preferred embodiment of the swivel chair 9 of the present invention comprise an upright post 4, a seat support 2 connected to a seat 2, a cup 5, a tapered roller bearing assembly 6, and a disc 10. The tapered roller bearing assembly 6 has an outer race 7, tapered rollers 16, and a cage 18 for retaining the rollers. The cage has a top circular edge 18a that protrudes above a top edge 5a of the cup. The disc has a top surface 10a and a bottom surface 10b. The bottom surface 10b of the disc is disposed adjacent to and supported by the top circular edge 18a of the cage. In this way, the tapered roller bearing assembly 6 can be disposed in the upright post 4 and the top surface 10a of the disc can support the seat support 2 connected to a seat 3 to constitute the swivel chair 9.

Another embodiment of the swivel chair 9 of the present invention comprises an upright post 4, a seat support 2 connected to a seat 3, a cup 5, a tapered roller bearing assembly 6, and a disc 10. The tapered roller bearing assembly has an inner race 20, an outer race 7, tapered rollers 16, and a cage 18 for retaining the rollers. The inner race has a top circular edge 20a that protrudes above a top edge 5a of the cup. The disc 10 has a top surface 10a and a bottom surface 10b, with the bottom surface disposed adjacent to and supported by the top circular edge 20a of the inner race 20 and the top surface 10a supporting a seat support 2 connected to a seat 3, whereby, the tapered roller bearing assembly 6 can be disposed on an upright post 4 with the disc 10 disposed between the tapered roller bearing assembly 6 and the seat 3 to constitute the swivel chair 9.

Additionally, the disc 10 may be free floating between the upright post 4 and the seat 3. In this way, the free floating disc 10 may be self-centering between the tapered roller bearing assembly and the seat support.

The cup and the disc can be made from many suitable materials, including aluminum, other metals, or various commercially available plastics. As previously mentioned, the separating element used for elevating the inner race assembly can be made from most friction reducing materials, including nylon, Teflon®, plastic or the like.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is base, may readily be utilized as a basis for the designing of other structures, methods and systems for carrying out the several purposes of the present invention. It is important, therefore, that the claims be regarded as including such equivalent constructions insofar as they do not depart from the spirit and scop of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A swivel chair joint for rotationally joining a seat support extending from a seat to a post, comprising:
   a tapered roller bearing assembly having a cup, an outer race, and an inner race assembly with a top portion of said inner race assembly extending out of the outer race, said tapered roller bearing assembly disposed on a top end of the post and said seat support resting upon the top portion of the inner race assembly, and a disc disposed between the seat support and the top portion of the inner race assembly, whereby, the seat is rotationally joined to the post.

2. The swivel chair joint of claim 1, wherein the disc is free floating.

3. The swivel chair joint of claim 1, wherein the disc is self-centering.

4. The swivel chair joint of claim 3, wherein the disc has a top surface and a bottom surface, with the bottom surface proximate to the top portion of the inner race assembly, and the bottom surface has a downwardly extending protuberance which can engage the inner race assembly.

5. The swivel chair joint of claim 1, further comprising a separating element and wherein the cup has a floor, said separating element being disposed between the inner race assembly and the floor of the cup, whereby, the top portion of the inner race assembly can be arranged to extend out of the cup by the separating element.

6. A swivel chair joint comprising:
a. a cup;
b. a tapered roller bearing assembly,
   i. said tapered roller bearing assembly having an outer race, tapered rollers, and a cage for retaining the rollers,
   ii. said cage having a top circular edge that protrudes above a top edge of the cup;
c. a disc with a top surface and a bottom surface,
   said bottom surface of the disc being disposed adjacent to and supported by the top circular edge of the cage,
   whereby, said tapered roller bearing assembly can be disposed in an upright post and the top surface of the disc can support a seat support connected to a seat.

7. A swivel chair joint comprising
a. a cup;
b. a tapered roller bearing assembly,
   i. said tapered roller bearing assembly having an inner race, an outer race, tapered rollers, and a cage for retaining the rollers,
   ii. said inner race having a top circular edge that protrudes above a top edge of the cup;
c. a disc having a top surface and a bottom surface, with the bottom surface disposed adjacent to and supported by the top circular edge of the inner race and the top surface supporting a seat support connected to a seat,
   whereby, the tapered roller bearing assembly can be disposed on an upright post with the disc disposed between the tapered roller bearing assembly and the seat.

8. The swivel chair joint of claim 6, wherein the disc is free floating between the upright post and the seat, and whereby, the free floating disc is self-centering.

9. A swivel chair, comprising:
a. an upright post;
b. a seat support connected to a seat; and
c. a tapered roller bearing assembly positioned between the upright post and the seat support,
   said tapered roller bearing assembly having a cup, an outer race and an inner race assembly with a top portion of said inner race assembly extending out of the cup,
   said tapered roller bearing assembly being disposed on a top end of the post and said seat support resting upon the top portion of the inner race assembly; and
d. a disc disposed between the seat support and the top portion of the inner race assembly,
   whereby, the seat is rotationally joined to the post.

10. The swivel chair of claim 9, wherein the disc is free floating.

11. The swivel chair of claim 9, wherein the disc is self-centering.

12. The swivel chair of claim 11, wherein the disc has a top surface and a bottom surface, with the bottom surface proximate to the top portion of the inner race assembly, and the bottom surface has a downwardly extending protuberance which can engage the inner race assembly.

13. The swivel chair of claim 9, further comprising a separating element and wherein the cup has a floor, said separating element being disposed between the outer race assembly and the floor of the cup, whereby, the top portion of the inner race assembly can be arranged to extend out of the cup by the separating element.

14. The swivel chair of claim 9, wherein post is stationarily supported by a base.

15. A swivel chair comprising
a. an upright post;
b. a seat support connected to a seat;
c. a cup:
d. a tapered roller bearing assembly,
   i. said tapered roller bearing assembly having an outer race, tapered rollers, and a cage for retaining the rollers,
   ii. said cage having a top circular edge that protrudes above a top edge of the cup;
e. a disc with a top surface and a bottom surface,
   said bottom surface of the disc being disposed adjacent to and supported by the top circular edge of the cage,
   whereby, said tapered roller bearing assembly can be disposed in the upright post and the top surface of the disc can support the seat support connected to a seat to constitute the swivel chair.

16. A swivel chair comprising
a. an upright post;
b. a cup;
c. a seat support connected to a seat;
d. a tapered roller bearing assembly,
   i. said tapered roller bearing assembly having an inner race, an outer race, tapered rollers, and a cage for retaining the rollers,
   ii. said inner race having a top circular edge that protrudes above a top edge of the cup;
e. a disc having a top surface and a bottom surface, with the bottom surface disposed adjacent to and supported by the top circular edge of the inner race and the top surface supporting a seat support connected to a seat,
   whereby, the tapered roller bearing assembly can be disposed on an upright post with the disc disposed between the tapered roller bearing assembly and the seat to constitute the swivel chair.

17. The swivel chair of claim 16, wherein the disc is free floating between the upright post and the seat, and whereby, the free floating disc is self-centering between the tapered roller bearing assembly and the seat support.

* * * * *